(12) United States Patent
Arsu et al.

(10) Patent No.: US 11,591,418 B2
(45) Date of Patent: Feb. 28, 2023

(54) POSS-TX NANO-PHOTO-INITIATOR SYNTHESIS AND IN SITU PHOTOCHEMICAL AG NANO-PARTICLE SYNTHESIS WITH THE HELP OF POSS-TX AND WRINKLED SURFACE FORMATION

(71) Applicant: Yildiz Teknik Universitesi, Istanbul (TR)

(72) Inventors: Nergis Arsu, Esenler/Istanbul (TR); Nuket Ocal, Esenler/Istanbul (TR); Omer Tahir Gunkara, Besiktas/Istanbul (TR); Gonul Saadet Batibay, Besiktas/Istanbul (TR)

(73) Assignee: Yildiz Teknik Universitesi, Istanbul (TR)

( * ) Notice: Subject to any disclaimer, the term of this patent is extended or adjusted under 35 U.S.C. 154(b) by 351 days.

(21) Appl. No.: 16/957,622

(22) PCT Filed: Dec. 28, 2018

(86) PCT No.: PCT/TR2018/050924
§ 371 (c)(1),
(2) Date: Jun. 24, 2020

(87) PCT Pub. No.: WO2019/132848
PCT Pub. Date: Jul. 4, 2019

(65) Prior Publication Data
US 2021/0054110 A1 Feb. 25, 2021

(30) Foreign Application Priority Data

Dec. 28, 2017 (TR) .................. 2017/22696
Dec. 25, 2018 (TR) .................. 2018/20442

(51) Int. Cl.
*C08G 77/14* (2006.01)
*C08F 2/50* (2006.01)
*C08F 222/10* (2006.01)
*C07F 7/08* (2006.01)
*C09D 4/06* (2006.01)
*C08K 5/549* (2006.01)
*C07F 7/02* (2006.01)
*C07F 7/18* (2006.01)
*C08F 2/46* (2006.01)
*C08K 3/08* (2006.01)
*C09D 183/06* (2006.01)
*C09D 5/28* (2006.01)
*C09D 183/08* (2006.01)

(52) U.S. Cl.
CPC .................. *C08F 2/50* (2013.01); *C07F 7/02* (2013.01); *C07F 7/08* (2013.01); *C07F 7/0834* (2013.01); *C07F 7/0838* (2013.01); *C07F 7/0878* (2013.01); *C07F 7/1872* (2013.01); *C08F 2/46* (2013.01); *C08F 222/102* (2020.02); *C08F 222/1063* (2020.02); *C08K 5/549* (2013.01); *C09D 4/06* (2013.01); *C07F 7/0812* (2013.01); *C08G 77/14* (2013.01); *C08K 2003/0806* (2013.01); *C08K 2201/011* (2013.01); *C09D 5/28* (2013.01); *C09D 183/06* (2013.01); *C09D 183/08* (2013.01)

(58) Field of Classification Search
CPC ........ C07F 7/08; C07F 7/0889; C07F 7/0834; C08G 77/045; C08G 77/26; C08G 77/28; C08G 77/14
See application file for complete search history.

(56) References Cited

U.S. PATENT DOCUMENTS

2012/0142793 A1* 6/2012 Frey .......................... C07F 7/21
522/35
2018/0371302 A1* 12/2018 Mizusaki .................. C08F 2/50

FOREIGN PATENT DOCUMENTS

WO 2010/063612 A1 6/2010

OTHER PUBLICATIONS

International Search Report and Written Opinion of the International Searching Authority for International Patent Application No. PCT/TR2018/050924 dated May 8, 2019, 9 pages.
Aydin, M. et al., "One-Component Bimolecular Photoinitiating Systems, 2a", Macromol. Rapid Commun. 24: 718-723 (2003).
Feher, F.J. et al., "Synthesis and Characterization of Labile Spherosilicates: [(Me3SnO)8Si8O12] and [(Me4SbO) 8Si8O12]", Inorganic Chemistry, 30(5): 880-882 (1991).
Hou, H. et al., "Multifunctional POSS-Based Nano-Photo-Initiator for Overcoming the Oxygen Inhibition of Photo-Polymerization and for Creating Self-Wrinkled Patterns", Advanced Materials Interfaces, 1(9): 1-8 (2014).
Kuo, S. et al., "POSS related polymer nanocomposites", Progress in Polymer Science, 36: 1649-1696 (2011).
Li, G. et al., "Polyhedral Oligomeric Silsesquioxane (POSS) Polymers and Copolymers: A Review", Journal of Inorganic and Organometallic Polymers, 11(3): 123-154 (2001).
Lin, H. et al., "Simultaneous Formation of a Self-Wrinkled Surface and Silver Nanoparticles on a Functional Photocuring Coating", Langmuir, 31(43): 11800-11808 (2015).
Rassaei, L. et al., "Layer-by-layer assembly of Ru3+ and Si8O8-20 into electrochemically active silicate films", J. Solid State Electrochem, 12: 747-755 (2008).
Wang, X. et al., Reversible self-assembly of dendrimer based on polyhedral oligomeric silsesquioxane (POSS), Supplementary Material (ESI) for Chemical Communications, 23 pages (2011).

* cited by examiner

Primary Examiner — Margaret G Moore
(74) Attorney, Agent, or Firm — Merchant & Gould P.C.

(57) ABSTRACT

The present invention particularly relates to synthesizing photo-initiators having poly-oligo-silsesquioxane (POSS) structure and realizing photo-polymerization by using these photo-initiators and simultaneous and in-situ synthesis of Ag nano-particles in polymer matrix comprising POSS structure and obtaining wrinkled surfaces as a result of self-arranging thereof.

9 Claims, No Drawings

US 11,591,418 B2

POSS-TX NANO-PHOTO-INITIATOR SYNTHESIS AND IN SITU PHOTOCHEMICAL AG NANO-PARTICLE SYNTHESIS WITH THE HELP OF POSS-TX AND WRINKLED SURFACE FORMATION

CROSS-REFERENCE TO RELATED APPLICATIONS

This application is a National Stage Application of PCT/TR2018/050924, filed 28 Dec. 2018, which claims the benefit of Turkish Patent Application No. 2017/22696, filed 28 Dec. 2017, and claims the benefit of Turkish Patent Application No. 2018/20442, filed 25 Dec. 2018, and which applications are incorporated herein by reference. To the extent appropriate, a claim of priority is made to each of the above-disclosed applications.

TECHNICAL FIELD

The present invention relates to obtaining a wrinkled surface which is compliant for use in flexible electronic materials and optic devices and which is self-assembled in situ and comprising nano-dimensioned silver nano-particles.

The present invention particularly relates to synthesizing photo-initiators having poly-oligo-silsesquioxane (POSS) structure and realizing photo-polymerization by using these photo-initiators and simultaneous and in-situ synthesis of Ag nano-particles in polymer matrix comprising POSS structure and obtaining wrinkled surfaces as a result of self-arranging thereof.

KNOWN STATE OF THE ART

Free radical photo-polymerization reactions are frequently used in coatings, micro-electronics, photo-resist and filling substances. Photo-polymerization is preferred more when compared with other systems since photo-polymerization have superior characteristics like lower energy consumption, lower cost, realization at suitable temperatures and occupation of less space.

Silsesquioxane group compounds belong to organo-silicon general group and they have $RSiO_{3/2}$ empirical chemical formula. R group can be one of alkyl, alkenyl, aryl or arylene groups (1). Said compounds are also used as catalyst or materials which provide pH adjustment (2, 3). Silsesquioxanes are cage-shaped structures and they are mostly in the form of cube, hexagonal prism, octagonal prism, decagonal prism, dodecagonal prism or sometimes, they can be in open cage form.

The 3 dimensional structures of silsesquioxanes, their high symmetries and their nanometer scale provide usage of them in synthesis of nano-compounds as synthesis constituent. The control of probable functional groups in orientation in 3 dimensions can be provided by means of these extraordinary nanometer scale synthesis structures. Silica cage provides tension and thermal stability as in typical organic molecules. By means of deriving silsesquioxanes with various groups, their physical characteristics can be changed. Thus, silsesquioxanes can be processed in an easier manner when compared with typical ceramics. Thanks to this structure which is functionalized with organic and inorganic groups, pluralities of nano-materials are made. The characteristics of these materials are much better than the typical polymer and ceramic. Besides, antimicrobial derivatives are also synthesized by means of various functionalizing reactions of silsesquioxanes.

Polyhedral Oligomeric Silsesquioxane (POSS) molecules, which create a different area in modern nano-technology, occur as a new chemical material for reinforcing both monomeric and polymeric structures. Polymers comprising POSS monomers are the subject of pluralities of studies since the thermal and mechanical characteristics thereof are improved. Polyhedral oligomeric silsesquioxane molecules are cubic-shaped filling materials whose three dimensions are at nanometer level.

In the present art, POSS nano phases are designed for preparing light and high-success hybrid nano-composites. In POSS-reinforced nano-composites, the success region is between the polymer region and the ceramic region. One of the two most important characteristics of POSS structures is the spherical-shaped hybrid structures, whose molecular dimensions are approximately 1-3 nm, between (POSS) silica ($SiO_2$) and silicon ($R_2SiO$). The POSS molecule with this dimension can very easily enter between the chains of all polymeric structures with molecular dimensions and dependently, this POSS molecule reinforces the polymer matrix (4).

Besides, in an opposite manner to silica, silicon and other fillings, any POSS molecule comprises organic groups which makes said POSS molecule compliant with polymer, biological systems or surfaces. In an opposite manner to ordinary organic compounds, they are known as odorless and environment-friendly since they do not release volatile organic compounds (5).

In the known state of the art, different POSS chemicals are prepared. POSS molecule can comprise one or some reactive organic group functionality. Therefore, POSS molecules can be added to known polymers by means of copolymerization, inoculation or mixing. Nano-composites reinforced with POSS can be used at high temperatures thanks to their thermal resistances. Moreover, these materials are stable against oxidation and have high mechanical characteristics and they have low flammability characteristic and the occurring heat amount and process viscosities thereof are low. The thermoplastic and thermoset characteristics of polymers, obtained by means of known monomers used frequently like meth-acrylate, sitren, norbornene, ethylene, epoxide and siloxane, can be improved by using POSS molecules (6).

Conventionally, metal nano-particles are synthesized by means of reduction of various salts of noble metals via various methods. In order to conventionally synthesize spherical-form nano-particles, reduction process is used with sodium citrate or sodium boro-hydride. Besides, the photo-reduction of metal salts with UV light is another nano-particle obtaining method.

Because of high free surface energy, clustering of metal nano-particles easily and distributing of thermodynamically unstable particles in the formulation are big problems, and various methods are used for surpassing this problem and for obtaining stable particles. As an example to these; citrate reduction, thiol stabilization and various thermal and photo-chemical methods, where thiols, amines, micelle, dendrimer and polymers are used, can be shown.

The size of the silver nano-particles and the control of their shape are substantially important. Since specific shape and size are important in optic, electronic and catalytic processes. Particularly, since optic characteristics depend on the particle shape, the presence of silver nano-particles in composites is important in terms of bio/nano-medicine, sensor, catalyst and nano-technology. The shape and dimensions of golden nano-particles can be determined by examining UV-VIS spectrums, and absorption is observed at wavelength of 420-450 nm by means of the effect of surface plasmon band or at less number of wavelengths or greater number of wavelengths depending on the particle dimension.

The studies related to POSS and photo-initiator mixtures are executed related to designing of new materials in various fields like electronic industry, bio-engineering and polymer industry. When the studies in the literature are examined, it is observed that no photo-initiators are synthesized having POSS-TX structure and silver nano-particles are not formed photo-chemically by using photo-initiator having similar thioxanthone (TX)-POSS structure.

As a result, because of all of the abovementioned problems and disadvantages, an improvement is required in the related technical field.

OBJECT OF THE INVENTION

The present invention relates to POSS-TX nano-photo-initiator and the synthesis of said POSS-TX nano-photo-initiator and in situ photochemical Ag nano-particle synthesis with the help of POSS-TX nano-photo-initiator and wrinkled surface formation, for eliminating the above mentioned disadvantages and for bringing new advantages to the related technical field.

The object of the present invention is to prepare thioxanthone (TX) derivative photo-initiator having poly-oligo-silsesquioxane (POSS) group and to develop a method to be used in the synthesizing of said molecule.

Another object of the present invention is to obtain silver nano-particles by using the synthesized photo-initiator.

The object of the present invention is to obtain a wrinkled surface in very short time and with high efficiency where the wrinkled surface comprises nano-dimensioned silver nano-particles and where in-situ and self-assembly are realized.

An object of the present invention is to obtain a wrinkled and antibacterial surface in a rapid manner by means of in situ single vessel method.

The structural and characteristic properties and all advantages of the present invention will be understood in a clearer manner thanks to the detailed description given below and therefore, evaluation shall be made by taking into consideration this detailed description.

DETAILED DESCRIPTION OF THE INVENTION

In this detailed description, obtaining a wrinkled surface, comprising nano-dimensioned silver nano-particles and where in-situ and self-assembly are realized, is explained with references to examples without forming any restrictive effect only in order to make the subject more understandable.

The present invention relates to a method for synthesizing of photo-initiators having poly-oligo-silsesquioxane (POSS) structure and for obtaining wrinkled surfaces as a result of simultaneous and in-situ synthesis of Ag nano-particles in polymer matrix comprising POSS structure. In said invention, as the initiator, POSS-TX is used which is synthesized within the scope of the subject matter invention and as monomer, poly(ethylene glycol) methyl ether acrylate (PEGMA)-poly(ethylene glycol) diacrylate (PEGDA) is used. The in-situ reduction of silver ions to silver nano-particles is realized by means of photo-polymerization method.

Accordingly, an item of the present invention relates to poly-oligo-silsesquioxane (POSS-TX) photo-initiators.

The subject matter POSS-TX photo-initiator has the structure shown by Formula I as below.

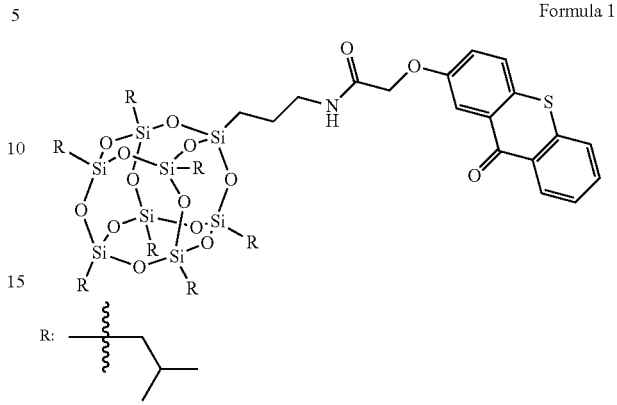

Formula 1

Another item of the present invention relates to a method to be used in preparation of POSS-TX photo-initiator, said method is characterized by comprising the steps of:
  Obtaining 2-[(9-oxo-9H-thioxanthone-2-yl)oxy]acetyl chloride (TX-OCH2COCl) compound by reacting 2-(carboxy-methoxy)thioxanthone (TX-OCH2COOH) compound in the presence of tiyonil chloride,
  Obtaining POSS-TX photo-initiator, shown by Formula I, by reacting 2-[(9-oxo-9H-thioxanthone-2-yl)oxy] acetyl chloride (TX-OCH2COCl) compound with the amino isopropyl POSS compound.

Another item of the present invention is to use POSS-TX photo-initiator shown by formula I as photo-initiator in photo-polymerization reactions.

From another perspective, the present invention relates to a method used in preparation of polymeric nano-composites comprising Ag-nanoparticle having antibacterial and wrinkled surface characteristic, characterized by comprising the steps of:
  Mixing POSS-TX and AgNO₃ salt and acrylic based oligomer and/or monomer at room temperature,
  Subjecting the obtained acrylic based mixture to homogenization and degassing processes respectively,
  Spreading the obtained mixture onto a glass or metal surface so as to form a layer with thickness of 20-40 µm,
  Subjecting the acrylic based mixture, spread on the surface, to UV light,
  Determining that the silver nano-particles are formed by means of observing that peak occurs between 400-450 nm at UV-Vis absorption spectrum.

Another item of the present invention is that the nano-composite surfaces comprising Ag-nano-particle are obtained by means of a method comprising the following steps:
  Mixing POSS-TX and AgNO₃ salt and acrylic based oligomer and monomer at room temperature,
  Subjecting the obtained acrylic based mixture to homogenization and degassing processes respectively,
  Spreading the obtained mixture onto a glass or metal surface so as to form a layer with thickness of 20-40 µm,
  Subjecting the acrylic based mixture, spread on the surface, to UV light,
  Determining that the silver nano-particles are formed by means of observing that peak occurs between 400-450 nm at UV-Vis absorption spectrum.

It has been surprisingly found that the Ag-nanoparticles obtained by means of this method have a wrinkled surface structure, and thus, the Ag nano-particles obtained by means of the method whose details are given above are different from the Ag nano-particles obtained by means of the methods already present in the known state of the art. The nano-composites comprising Ag nano-particles having such wrinkled surface are suitable for use in preparation of flexible electronic material and devices. Besides being suitable for use in preparation of flexible electronic material and devices, the subject matter nano-composites comprising Ag nano-particles of the invention also show anti-bacterial characteristic.

Accordingly, an item of the present invention is that the subject matter nano-composites comprising Ag nano-particles of the invention are used in preparation of flexible electronic material and devices.

The statement of "acrylic-based oligomer and monomer" used within the scope of the present invention can be for instance poly(ethylene glycol)diacrylate (for instance, Mn=700) and poly(ethylene glycol)methyl ether akrilat (for instance, Mn=500), poly(ethylene glycol) mono-acrylate.

Within the scope of this specification, the "comprising" statement is aimed to describe "covering".

In places where technically suitable, the applications of the present invention can be combined.

The applications are explained so as to comprise specific characteristics/elements here. The specification moreover covers the applications comprising the abovementioned characteristics/elements or other applications consisting of the abovementioned characteristics/elements.

The technical references similar to patents and applications have been included to this document by means of reference.

Here, the specifically and apparently described applications can form basis for a disclaimer in a stand-alone manner or together with one or some other applications.

Now, the present invention will be explained with reference to the below mentioned examples which are only for exemplary purposes and which shall not be interpreted in a manner delimiting the scope of the present invention in any manner.

EXAMPLES

Example 1: POSS-TX Photo-Initiator Synthesis 2-(carboxy-methoxy)thioxanthone (TX-OCH2COOH) compound is synthesized and purified by using thiosalicylic acid according to literature, 2-[(9-oxo-9H-thioxanthone-2-yl)oxy]acetyl chloride (TX-OCH2COCl) compound and the purified compound are synthesized by using tiyonil chloride reactive and the structure of the obtained compound is illuminated by using FTIR, 1H-NMR, APT spectrums, POSS-TX photo-initiator is synthesized as a result of reaction of TX-OCH2COCl compound and aminoisopropyl POSS compound and the structure of the obtained compound is illuminated by using FTIR, 1H-NMR, APT spectrums.

The structure of the subject matter POSS-TX photo-initiator has been illuminated by means of the below mentioned 1H-NMR and 13C-NMR data.

1H NMR (500 MHz, CDCl3, d): 0.53 (dd, J=3.78; 9.45 Hz, 16H, CH2-Si), 0.88 (dd, J=2.20; 6.62 Hz, 42H, CH3), 0.57-0.61 (m, 2H, CH2), 1.77 (hept, 7H, CH), 2.86-2.91 (m, 1H, N—CH2), 4.76 (s, 1H, O—CH2), 7.36 (dd, J=2.83; 8.82 Hz, 1H, Ar H), 7.44-7.49 (m, 2H, Ar H), 7.56-7.61 (m, 2H, Ar H), 7.85 (bd, J=2.83 Hz, 1H, Ar H), 8.16 (brs, 1H, NH), 8.54 (d, J=8.82 Hz, 1H, Ar H);

13C NMR (125 MHz, CDCl3, d): 9.3 (7×CH), 22.4 (7×CH3), 22.5 (7×CH3), 23.8 (CH2), 25.6 (8×CH2), 40.3 (N—CH2), 43.2 (O—CH2), 111.2 (Car), 123.1 (Car), 125.9 (Car), 127.1 (Car), 128.3 (Cq), 129.1 (Cq), 129.7 (Cq), 129.8 (Car), 131.9 (Car), 137.6 (Cq), 157.5 (Cq), 161.0 (Car), 174.4 (C¼O), 179.6 (C¼O)

The silver nano-particle and wrinkled surface obtaining method comprises these process steps: preparing solution by using formulation and obtaining nano-composite film by means of the prepared solution.

In order to prepare cross-bonded polymer in said formulation, as the acrylic-based oligomer and acrylic-based monomer, poly(ethylene glycol) diacrylate, poly(ethylene glycol) mono-acrylate, poly(ethylene glycol) methyl ether acrylate are used.

Example 2: Preparing Solution by Using Formulation

POSS-TX and AgNO$_3$ are put in a beaker at room temperature,

Acrylic-based oligomer and monomer are added to the beaker,

The obtained acrylic-based mixture is left to ultrasonic bath at room temperature for 15 minutes, In order to homogenize acrylic-based mixture, it is mixed for approximately 2 seconds in probe-type ultrasonic stirrer, In the final step, degassing is obtained by means of ultrasonic bath.

Example 3: Obtaining Nano-Composite Film by Means of the Prepared Solution

The obtained solution is coated onto the glass plate such that the thickness of the coating is 40 micrometers, The solution, coated onto the glass plate, is subjected to UV light by means of UV-curing device.

The photo-initiator, having POSS cage synthesized within the scope of the present invention, has an important role in realization of the polymerization and in formation of the wrinkled surface. By means of Ag nano-particle synthesis, the self-arrangement and antibacterial surface characteristic of Ag nano-particles in the POSS cage is provided together with photo-initiator from Ag salt.

The illumination time and light density, forming the photo-chemical illumination method which is one of the process steps of the subject matter method, provide contribution to the surface characteristics and nano-particle formation.

The characterization of silver nano-particles in the nano-composite material is determined by means of UV-VIS spectrums. When the spectrum is examined, silver nano-particles realize absorption between 420-450 nm. The obtained absorption values of the silver nano-particles are obtained in a similar manner to the values which are present in the literature.

When the SEM diagram is examined, it is observed that wrinkled surface is formed and the Ag nano-particles is distributed in a uniform-shaped manner in the polymer matrix comprising POSS cage.

By means of the subject matter invention, wrinkled surfaces have been obtained as a result of simultaneous and in-situ synthesis of Ag nano-particles in the polymer matrix comprising POSS structure and it has been confirmed that wrinkled surfaces have been obtained by means of the SEM graphics and UV-Vis results.

RESOURCES

1) Guizhi Li, Lichang Wang; Pittman, Jr., Charles U. (2001). "Polyhedral Oligomeric Silsesquioxane (POSS): a Review". Journal of Inorganic and Organometallic Polymers 11 (3): 123.
2) Layer-by-layer assembly of $Ru^{3+}$ and $Si_8O_2O8-$ into electrochemically active silicate films, Rassaei, L; Sillanpaa, M; Milsom, E V, et al., Journal of solid state electrochemistry 12 (2008) 747-755.
3) Wang, X.; Ervithayasuporn, V.; Zhang Y.; Kawakami, Y. (2011). "Reversible self-assembly of dendrimer based on polyhedral oligomeric silsesquioxanes (POSS)". Chemical Communications 47: 1282.
4) Feher, F. J., Weller, K. J. (1991) Inorganic Chem. 30:880.
5) Li, G., Wang, L., Hanli, Ni, Pittman, C. U., (2001). "Polyhedral Oligomeric Silsesquioxane (POSS) Polymers and Copolymers"
6) Kuo, S. W., Chang, F. C., (2011). "POSS Related Polymer Nanocomposites"

The invention claimed is:

1. A method for obtaining an antibacterial and wrinkled surface which is in nano-composite structure comprising Ag nano-particle in a rapid manner by means of in situ single vessel method, in order to be used in flexible electronic materials and optical devices; characterized by comprising the steps of:
   a) Mixing POSS-TX and $AgNO_3$ salt and acrylic based oligomer and/or monomer at room temperature,
   b) Subjecting the obtained acrylic based mixture to ultrasonic bath homogenization and degassing processes respectively,
   c) Spreading the obtained mixture onto a glass or metal surface so as to form a layer with thickness of 20-40 μm,
   d) Subjecting the acrylic based mixture, spread on the surface, to UV light,
   e) Determining that the silver nano-particles are formed by means of observing that peak occurs between 400-450 nm at UV-Vis absorption spectrum.

2. The method for obtaining an antibacterial and wrinkled surface according to claim 1, wherein in process step a, said acrylic-based oligomer and/or monomer is poly(ethylene glycol) diacrylate, poly(ethylene glycol) mono-acrylate and poly(ethylene glycol) methyl ether acrylate.

3. The method for obtaining an antibacterial and wrinkled surface according to claim 1, wherein in process step b, said process of leaving to ultrasonic bath is realized for 15 minutes at room temperature.

4. A nano-composite surface comprising an Ag-nano-particle obtained by means of the method according to claim 1.

5. A flexible electronic material or device comprising the nano-composite surface of claim 4.

6. The material or device according to claim 5, wherein the nano-composite surface comprising Ag-nano-particle is used in preparation of flexible electronic materials and devices with antibacterial characteristic.

7. A POSS-TX photo-initiator shown by Formula I which is suitable for use in preparation of nano-composite surfaces comprising Ag-nano-particle:

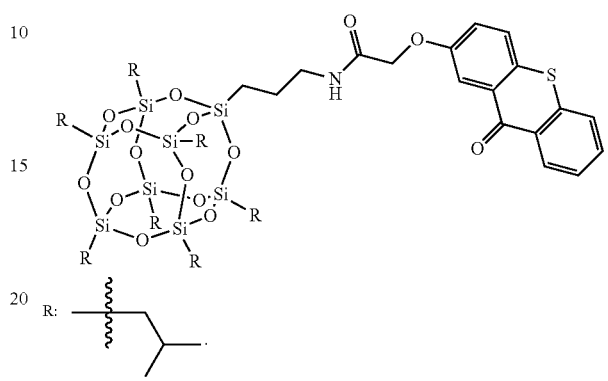

Formula 1

8. A method of preparation of the POSS-TX photo-initiator according to claim 7, wherein the following steps are provided:
   obtaining 2-[(9-oxo-9H-thioxanthone-2-yl)oxy]acetyl chloride (TX-OCH$_2$COCl) compound by reacting 2-(carboxy-methoxy)thioxanthone (TX-OCH$_2$COOH) compound in the presence of tiyonil chloride,
   obtaining a POSS-TX photo-initiator, having Formula I:

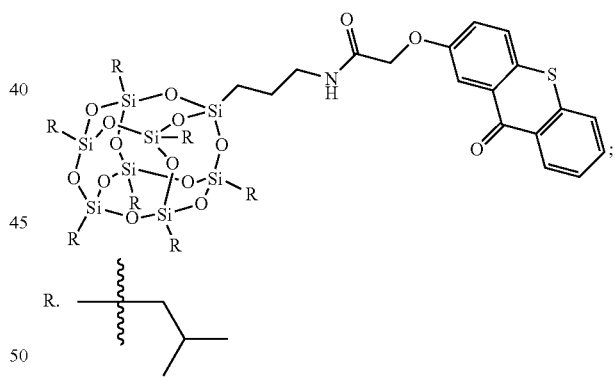

Formula I by reacting 2-[(9-oxo-9H-thioxanthone-2-yl)oxy]acetyl chloride (TX-OCH$_2$COCl) compound with the amino isopropyl POSS compound.

9. A method comprising usage of POSS-TX photo-initiator according to claim 7 as photo-initiator in photo-polymerization reactions.

* * * * *